May 21, 1935.  E. U. LASSEN ET AL  2,002,268
ELECTRIC MOTOR CONTROL SYSTEM
Filed July 15, 1933  3 Sheets-Sheet 1
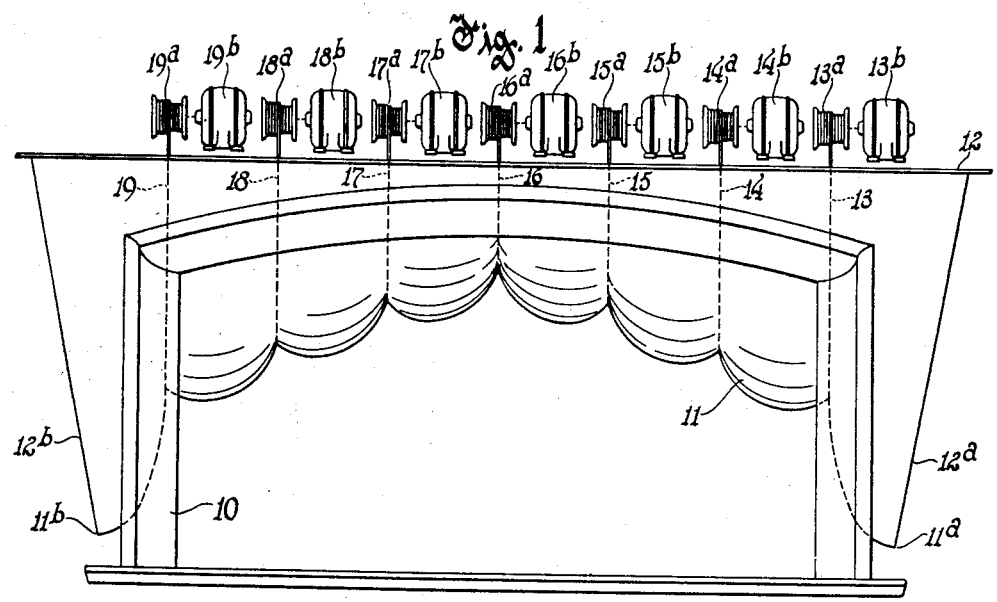
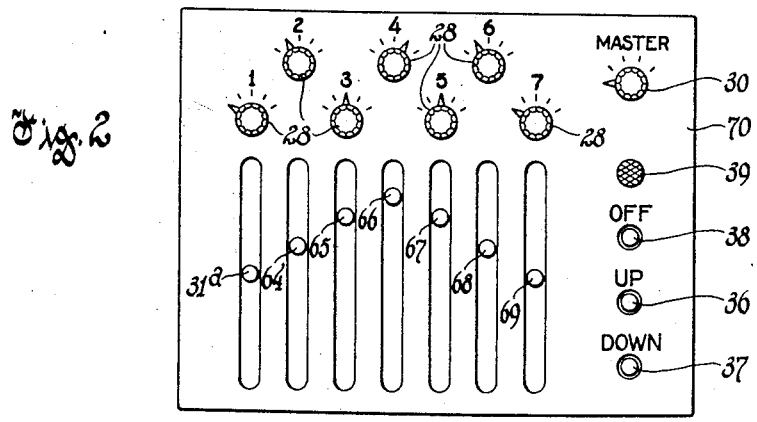
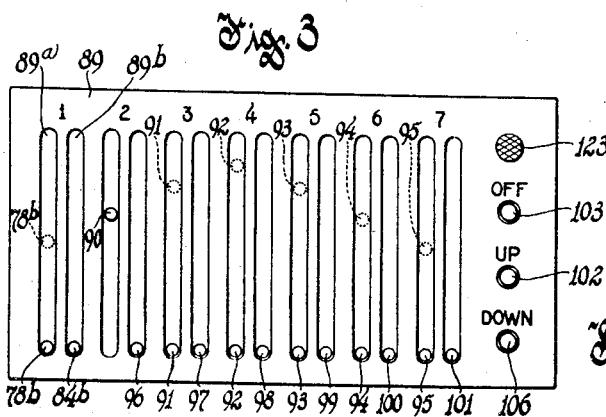
Inventors
Eivind U. Lassen
Edwin W. Seeger
By Frank H. Hubbard
Attorney May 21, 1935.   E. U. LASSEN ET AL   2,002,268
ELECTRIC MOTOR CONTROL SYSTEM
Filed July 15, 1933   3 Sheets-Sheet 3
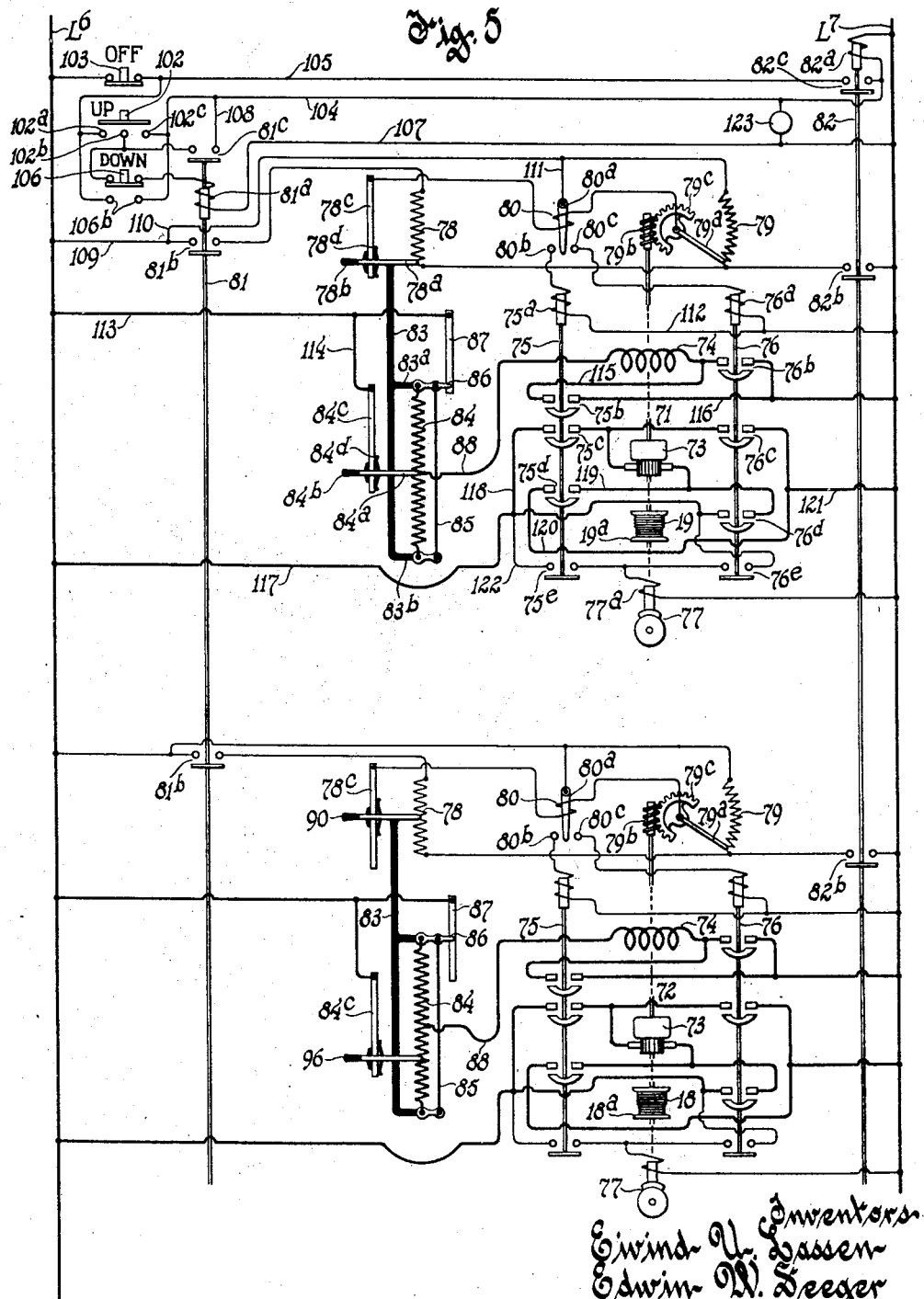

Patented May 21, 1935

2,002,268

UNITED STATES PATENT OFFICE 2,002,268

ELECTRIC MOTOR CONTROL SYSTEM

Eivind U. Lassen, West Allis, and Edwin W. Seeger, Wauwatosa, Wis., assignors to Cutler-Hammer, Inc., Milwaukee, Wis., a corporation of Delaware Application July 15, 1933, Serial No. 680,536

17 Claims. (Cl. 156—46)

This invention relates to improvements in electric motor control systems. Although not limited thereto the present invention is particularly applicable to control of the multiple hoist motors of stage encore curtains and the like.

An object of the invention is to provide a simple and flexible system of control whereby the operating conditions of a plurality of associated driving motors may be preselected individually at will.

Another object is to provide a system of the aforementioned character wherein a common control instrumentality may be utilized for simultaneously initiating operation of all active motors at will.

Another object is to provide such a system embodying novel means for affording individual and/or joint control of the speeds of the several motors.

Another and more specific object is to provide a novel system of pre-set control for the multiple hoist motors of stage curtains and the like.

Another object is to provide a novel arrangement of the control parts whereby the contour to be assumed by the curtain may be indicated in advance.

Another object is to provide a pre-set contour control system for stage curtains, embodying a single push button switch for insuring lowering of the curtain at will and a second push button switch operable at will to insure repeated attainment of a preselected contour of the curtain.

Another object is to provide a system enabling preselection of a curtain contour differing from that obtaining without disturbance of the latter pending the time at which a change is desired.

Other objects and advantages of the invention will be apparent from the following description.

The accompanying drawings illustrate certain embodiments of the invention which will now be described, it being understood that the invention is susceptible of embodiment in other forms without departing from the scope of the appended claims.

In the drawings, Figure 1 is a front elevational view of the proscenium of a theatrical stage or the like, showing the stage curtain draped or drawn to a contour preselected therefor,—a schematic arrangement of the electric driving motors and hoisting cables being illustrated.

Fig. 2 is a front view of a control panel, illustrating the novel arrangement of certain of the control elements employed in the system of Fig. 4,—said elements being adapted to simulate or indicate a preselected curtain contour substantially like that shown in Fig. 1,—said panel carrying all of the other manual control elements necessary for a complete system.

Fig. 3 is a view similar to Fig. 2, but illustrating a modified form and arrangement of the manual control elements.

Figure 4:
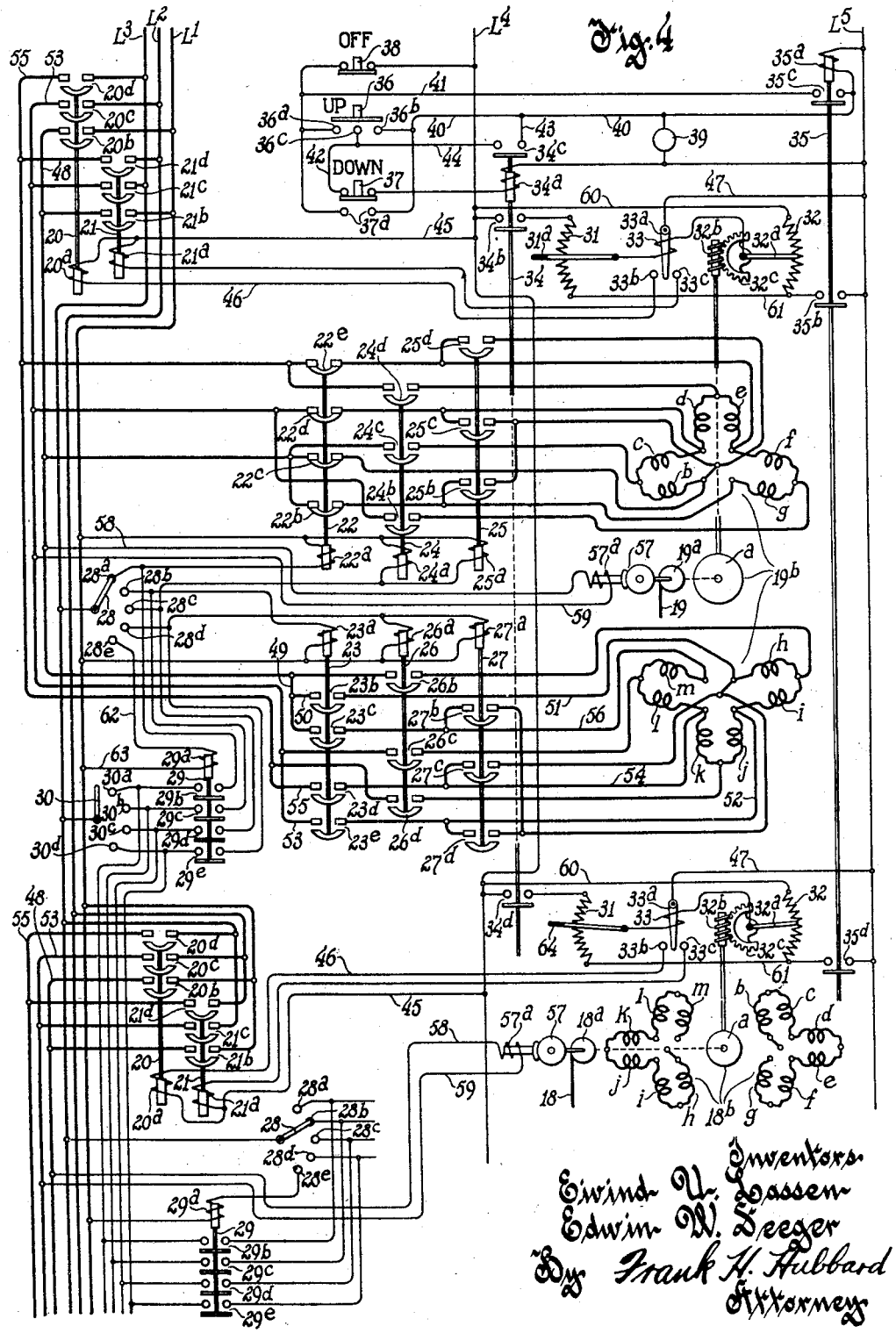

Fig. 4 is a schematic and diagrammatic view of one form of control system embodying our invention, the control panel of which is shown in Fig. 2,—the individual control elements for one driving motor being shown in detail; the duplicate individual control elements for a second motor being shown more diagrammatically; and it being understood that the individual control elements will be further duplicated to correspond with the number of driving motors employed in a given system (seven driving motors being employed in the scheme illustrated in Fig. 1),—the three push button switches of the control station or panel being common to all motors employed, and Fig. 5 is a view similar to Fig. 4, but showing a modified form and arrangement of control elements, the control panel thereof being illustrated in Fig. 3,—the individual control elements for but two motors being illustrated, but it is to be understood that the number thereof will correspond with the actual number of motors employed.

Referring first to Fig. 1, the numeral 10 designates in general the proscenium or border of a stage opening, behind which the curtain 11 (which may be termed the "encore" curtain) is hung or mounted, as by attaching the upper end or edge thereof to a fixed supporting bar or cable 12,—the height of the curtain with respect to the proscenium or stage opening being such as to suit the particular requirements of an installation. The curtain 11 preferably is of a width considerably in excess of the width of the proscenium whereby the desired fulness thereof to facilitate artistic draping is provided,—the opposite ends 11$^a$, 11$^b$ being preferably attached to cables 12$^a$, 12$^b$ of fixed length which are in turn attached to bar 12. In Fig. 1 we have shown seven cables or ropes 13 to 19, inclusive, attached to the rear side of curtain 11 at spaced points along the lower edge thereof,—the other ends of said ropes being respectively attached to sheaves or winding drums 13$^a$ to 19$^a$, inclusive, which sheaves are adapted to be rotated in opposite directions selectively by the motors 13$^b$ to 19$^b$ to effect raising and/or lowering of the corresponding portions of the curtain. Thus by properly controlling the operation of motors 13$^b$ to 19$^b$, inclusive, the curtain 11 may be lowered at will or drawn to substantially any desired contour. Figs. 2 and 4 jointly illustrate one system of control for such motors.

In Fig. 4 the two motors 19$^b$, 18$^b$ illustrated are of a well-known polyphase induction type,—each motor having a squirrel-cage rotor $a$ and multi-speed stator windings designated by the reference characters $b$ to $m$, inclusive. The individual control for each motor comprises a pair of electro-magnetically operable switches 20 and 21,—the former being adapted upon closure of its contacts to provide for operation of its respective motor in a forward or "hoist" direction, and the latter being adapted upon closure of its contacts to provide for reverse or "lowering" operation of said motor, such operations, however, being further dependent upon closure of one of the switches 22 or 23 individually or closure of one of the groups of switches 24, 25 or 26, 27 whereby the speed of operation of said motor is controlled. Energization of switches 22 to 27 is subject to control by a selector switch having a manually operable contactor 28 and stationary contacts 28$^a$ to 28$^d$, inclusive; each of said selector switches having an additional stationary contact 28$^e$ adapted when engaged by its cooperating contactor 28 to provide an energizing circuit for the winding 29$^a$ of a relay 29. Relays 29 when thus energized are adapted to transfer speed control of their respectively associated motors to a common or master speed selecting switch having a contactor 30 and stationary contacts 30$^a$ to 30$^d$, inclusive. It is to be understood that switches corresponding to switches 22 to 27, inclusive, will likewise be provided for energization control of the windings of motor 18$^b$, and that all other motors employed in the system will be provided with control elements identical with the control elements of motor 19$^b$ herein specifically described. The several motors are adapted to be supplied with energy from the polyphase alternating current supply lines L$^1$, L$^2$ and L$^3$. The control elements of the system are preferably adapted to be connected with a direct current source of supply represented by lines L$^4$ and L$^5$.

Thus we have shown presettable means individual to motor 19$^b$ for controlling the direction and degree of operation thereof, said means comprising essentially a sending rheostat 31 having a manually adjustable contactor the operating handle of which is designated by the numeral 31$^a$, a receiving rheostat 32 having a contactor 32$^a$ to be operated by the shaft of motor 19$^b$ through the medium of worm and pinion gearing 32$^b$, 32$^c$, and a polarized relay coil 33 to be connected between contactors 31$^a$ and 32$^a$. Associated with coil 33 is a contactor 33$^a$ which is normally biased to an intermediate or neutral position but is movable in one direction into engagement with contact 33$^b$ or in the opposite direction into engagement with contact 33$^c$, according to the direction of current flow through coil 33.

A pair of relays 34 and 35 are provided, relay 34 having an operating winding 34$^a$, normally open main contacts 34$^b$ and normally open auxiliary contacts 34$^c$; and relay 35 having an operating winding 35$^a$, normally open main contacts 35$^b$ and normally open auxiliary contacts 35$^c$. Contacts 34$^b$, 35$^b$ when closed provide for connection of the parts 31, 32, 33 to lines L$^4$, L$^5$ in the form of a Wheatstone bridge. As will be understood, relays 34 and 35 are provided with additional main contacts corresponding to the number of motors employed, the additional contacts associated with the control elements of motor 18$^b$ being shown at 34$^d$ and 35$^d$.

The "up" push button switch 36 is adapted upon closure thereof to effect energization and closure of both relays 34 and 35; the "down" push button switch 37 is adapted upon closure of its normally open contacts 37$^a$ to effect energization and closure of relay 35 only; and the "off" push button switch 38 is adapted upon opening thereof to interrupt the energizing circuits of either or both of said relays 34 and 35. A lamp 39 of suitable color (such as red) is preferably so arranged as to be energized during closure of the auxiliary contacts 35$^c$ of relay 35, thus indicating that "off" push button 38 has not yet been depressed to provide for presetting of a curtain contour differing from that obtaining.

As will be understood the contactor 33$^a$ of the polarized relay is adapted upon engagement thereof with contact 33$^c$ to complete the energizing circuit of the winding 21$^a$ of switch 21, thus providing for operation of motor 19$^b$ in a direction to effect lowering of the curtain portion controlled thereby; and said contactor 33$^a$ is adapted upon engagement thereof with contact 33$^b$ to complete the energizing circuit of the winding 20$^a$ of switch 20, thus providing for operation of motor 19$^b$ in a direction to effect hoisting of said curtain portion.

The manner in which the operation of motor 19$^b$ is controlled will now be described in detail, it being understood that each of the other motors in the system will be provided with like individual control elements and that the relays 34, 35, push button switches 36, 37, 38 and master speed control switch 30 are common to all motors in the system. Thus it may be assumed that the contactors 31$^a$, 32$^a$ of the Wheatstone bridge pre-set and follow-up control means are in their lower extreme positions, which corresponds with complete lowering of the curtain portion controlled by cable 19. Let it be further assumed that contactor 31$^a$ is then moved to its mid-position (as illustrated in Figs. 4 and 2) thus preselecting a mid- or half-raised position of the curtain portion controlled by motor 19$^b$. Inasmuch as the curtain portion aforementioned is to travel upwardly only one-half of its full range, we prefer to provide for operation of motor 19$^b$ at substantially half-speed (that is, one-half as fast as the full-speed rate of operation thereof). This desirable condition may be preselected by moving the contactor 28 of the speed-selector switch into engagement with contact 28$^b$, whereby a circuit is completed from line L$^3$ through contactor 28, contact 28$^b$ through the operating winding 23$^a$ of switch 23 to line L$^1$, with consequent closure of contacts 23$^b$, 23$^c$, 23$^d$ and 23$^e$ of said switch.

If now the push button 36 is temporarily depressed, a circuit will be completed for the operating winding 35$^a$ of relay 35, said circuit extending from line L$^4$ through normally closed push button switch 38, through contacts 36$^a$, 36$^b$ of switch 36, and by conductor 40 through said winding 35$^a$ to line L$^5$. Auxiliary contacts 35$^c$ of said relay when closed provide a maintaining circuit for said winding through conductor 41 shunting said switch 36. Switch 36 when closed likewise provides an energizing circuit for the operating winding 34$^a$ of relay 34, said circuit extending from line L$^4$ through switch 38, through contacts 36$^a$, 36$^c$ of switch 36 by conductor 42 through the normally closed contacts of push button switch 37, and through said winding 34$^a$ to line L$^5$. The auxiliary contacts 34$^c$ thereupon act to provide a maintaining circuit for winding 34$^a$, said maintaining circuit extending from line L$^4$ through switch 38 by conductor 41 through contacts 35ᶜ of relay 35, thence by conductors 40 and 43 through said contacts 34ᶜ, conductors 44 and 42 through the normally closed contacts of switch 37 and through winding 34ᵃ to line L⁵.

The Wheatstone bridge circuit is thus completed (by closure of contacts 34ᵇ and 35ᵇ of relays 34 and 35), and with contactor 31ᵃ in the mid-position thereof illustrated and with contactor 32ᵃ in its lower extreme position, as heretofore mentioned, current will be caused to flow through the polarized relay coil 33 in a direction to effect movement of contactor 33ᵃ into engagement with contact 33ᵇ. An energizing circuit for the winding 20ᵃ of switch 20 will thus be completed, said circuit extending from line L⁴ by conductor 45 through said coil 20ᵃ, conductor 46 to contact 33ᵇ and contactor 33ᵃ, and conductor 47 to line L⁵. Contacts 20ᵇ, 20ᶜ and 20ᵈ of said switch are thereby closed,—thus completing a circuit which effects hoisting operation of motor 19ᵇ at half-speed. Said circuit may be traced from line L¹ through said contacts 20ᵇ, conductors 48, 49 and 50 through contacts 23ᵇ of switch 23 (said switch being closed due to positioning of selector switch contactor 28 in engagement with contact 28ᵇ, as aforedescribed), conductor 51 through windings $h$ and $i$ in series with each other, conductor 52 through contacts 23ᶜ, conductor 53 through contacts 20ᶜ to line L²; also from line L² through common conductor 52 aforementioned through windings $j, k$ in series, by conductor 54 through contacts 23ᵈ and conductor 55 through contacts 20ᵈ to line L³; and from line L³ and common conductor 54 through windings $l, m$ in series, by conductor 56 through contacts 23ᵇ and conductor 49 through contacts 20ᵇ to line L¹. The three groups of windings $h, i, j, k$ and $l, m$ are thus connected in parallel or delta relation across the polyphase supply lines L¹, L² and L³, wherefore a given speed of operation of the motor in a hoisting direction is insured.

Also upon closure of switch 20 an energizing circuit is provided for the releasing winding 57ᵃ of brake 57,—said circuit extending from line L¹ through contacts 20ᵇ, conductors 48 and 58 through said winding 57ᵃ, and by conductors 59 and 53 through contacts 20ᶜ to line L². During said hoisting operation of motor 19ᵇ, the same acts through aforementioned worm and pinion gearing 32ᵇ, 32ᶜ to effect upward movement of rheostat contactor 32ᵃ from its lower extreme position. When said contactor 32ᵃ reaches the mid-position thereof illustrated it is of course understood that the Wheatstone bridge circuit will be balanced. Thereupon the polarized relay contactor 33ᵃ will move to the normal position thereof illustrated, thus interrupting the energizing circuit of the operating winding 20ᵃ of switch 20, and the contacts 20ᵇ, 20ᶜ and 20ᵈ thereof when opened will interrupt the aforedescribed energizing circuit of motor 19ᵇ and the energizing circuit of brake-releasing winding 57ᵃ.

As aforeindicated the relays 34 and 35 will remain energized, and hence if it is desired (as in rehearsal) to raise still further the curtain portion controlled by motor 19ᵇ this result may be attained by manually moving the rheostat contactor handle 31ᵃ upwardly to the desired extent, with consequent unbalancing of the Wheatstone bridge circuit such as to effect re-engagement of polarized relay contactor 33ᵃ with contact 33ᵇ. The winding 20ᵃ is therefore again energized to complete the aforedescribed circuit of motor 19ᵇ, and the brake releasing coil 57ᵃ is simultaneously energized. The motor will continue to operate until the bridge is balanced, by movement of contactor 32ᵃ upwardly to a position corresponding to the relative position of contactor 31ᵃ; the parts then acting in the manner aforedescribed to effect interruption of the motor circuit and application of the brake.

With the contactors 31ᵃ and 32ᵃ in the mid-positions thereof illustrated the portion of the curtain controlled by motor 19ᵇ may be lowered to the desired extent by effecting a corresponding downward movement of contactor 31ᵃ. This will effect unbalancing of the Wheatstone bridge circuit in the opposite sense, wherefore the polarized relay contactor 33ᵃ is engaged with contact 33ᶜ, thus completing an energizing circuit for the operating winding 21ᵃ of switch 21. The contacts 21ᵇ, 21ᶜ and 21ᵈ of said switch again complete a circuit for motor 19ᵇ but with a phase relationship of the groups of windings which is the reverse of that aforedescribed. Thus the contacts 21ᵇ and 21ᶜ when closed effect connection of the group of windings $h, i$ in series between lines L¹ and L³; contacts 21ᶜ, 21ᵈ effect connection of windings $j, k$ in series between lines L³ and L²; and contacts 21ᵈ and 21ᵇ effect connection of windings $l, m$ in series between lines L² and L¹. Contacts 21ᵇ, 21ᶜ also act to complete an energizing circuit for the brake-releasing winding 57ᵃ,—said circuit being obvious. Motor 19ᵇ therefore operates in a direction to effect lowering of the curtain portion controlled thereby pending lowering of contactor 32ᵃ to a position corresponding to the position of contactor 31ᵃ. The Wheatstone bridge circuit will thus be balanced to effect disengagement of contactor 33ᵃ from contact 33ᶜ, with consequent de-energization of the winding 21ᵃ of switch 21 to interrupt the motor circuit and permit application of the brake 57.

If it is desired to effect complete lowering of the curtain portion controlled by motor 19ᵇ this may be accomplished, without requiring any adjustment of the contactor 31ᵃ, by merely temporarily depressing the "down" push button switch 37. Opening of the normally closed contacts of said switch 37 effects interruption of the aforedescribed maintaining circuit for the winding 34ᵃ of relay 34 wherefore the latter is permitted to move to open position. Full downward movement of said button 37 will complete an alternative energizing circuit for the winding 35ᵃ of relay 35 (which alternative circuit is only required to function after interruption of the maintaining circuit of winding 35ᵃ through opening of "off" push button switch 38, as hereinafter more fully described). With relay 35 closed and relay 34 opened, as just described, current will flow through the polarized relay coil 33 in a direction to effect engagement of contactor 33ᵃ with contact 33ᶜ, regardless of the position of rheostat contactor 31ᵃ, so long as contactor 32ᵃ is in a position other than its lower extreme position. The circuit for said coil 33 may be traced from line L⁴ by conductor 60 downwardly through a portion of rheostat 32 as determined by the instantaneous position of contactor 32ᵃ, thence through said contactor 32ᵃ and coil 33, through contactor 31ᵃ and downwardly through a portion of rheostat 31 as determined by the adjustment of said contactor 31ᵃ, and by conductor 61 through relay contacts 35ᵇ to line L⁵. The consequent engagement of contactor 33ᵃ with contact 33ᶜ will complete the energizing circuit for the winding 21ᵃ of switch 21, and motor 19ᵇ will be operated in a manner to effect lowering of the curtain portion controlled thereby pending movement of contactor 32ª to its lower extreme position by said motor 19ᵇ (said extreme position of contactor 32ª, of course, corresponding to complete lowering of said curtain portion). When contactor 32ª has reached its lower extreme position the polarized relay coil 33 will be subjected to like potentials at opposite ends thereof (or, in other words, there will be no current flow therethrough) and hence the contactor 33ª will move to the neutral position thereof illustrated to effect interruption of the motor circuit and application of the electromagnetically controlled brake 57.

Let it be assumed that contactor 31ª was initially adjusted to its mid-position (as shown) to preselect a movement of the curtain portion controlled by motor 19ᵇ to half-hoisted position, and that the control elements have been operated in the manner aforedescribed to effect attainment of such preselected position (as indicated by the mid-positioning of contactor 32ª). If it is desired to subsequently change the position of said curtain portion (as by further raising or partially lowering the same), such position may be preselected without immediately initiating operation of motor 19ᵇ to effect the change, in the following manner: The "off" push button 38 is momentarily depressed to interrupt the maintaining circuits of both of the relay windings 34ª and 35ª, and the contacts 34ᵇ, 35ᵇ of said relays will be opened to entirely disconnect the aforedescribed Wheatstone bridge circuit. The other main contacts 34ᵈ, 35ᵈ, etc., of said relays will of course be opened to disable all of the Wheatstone bridge circuits employed in the particular installation. The brake 57 associated with motor 19ᵇ will insure maintenance of the associated curtain portion in any position to which it may have been adjusted, say, the half-hoisted position thereof. Manifestly therefore the contactor 31ª may be moved up or down from the mid-position shown to preselect another position for the curtain portion controlled by motor 19ᵇ; and assuming completion of the desired adjustments of all of the sending rheostats, the change in the curtain contour as a whole may be initiated by temporarily depressing the "up" push button switch 36, whereby the energizing circuits of coils 34ª and 35ª of relays 34 and 35 are completed and maintained in the manner aforedescribed. In each case the speed selected for a given motor should correspond approximately at least to the range of movement of a given curtain portion from its instantaneous position to the position preselected therefor. Thus if the curtain portion controlled by motor 19ᵇ is to be moved from the half-raised position thereof (as indicated by the position of contactor 31ª of the Wheatstone bridge) to the three-quarters raised position, it will be apparent that said portion must travel through one-quarter of its range, and one-fourth speed for motor 19ᵇ should be preselected by movement of the speed-selecting contactor into engagement with contact 28ª (which is the position illustrated by way of example). The same speed would of course be suitable if said curtain portion were to be moved downwardly from half-raised to quarter-raised position.

As will be noted, engagement of contactor 28 with contact 28ª completes an energizing circuit for the winding 22ª of switch 22, the contacts 22ᵇ, 22ᶜ, 22ᵈ and 22ᵉ of which when closed provide for connection of the series groups of windings $b$, $c$; $d$, $e$ and $f$, $g$ across the respective phases of lines $L^1$, $L^2$ and $L^3$,—in relations depending upon closure of one or the other of the switches 20 and 21.

Three-quarters speed of motor 19ᵇ may be provided by effecting engagement of contactor 28 with contact 28ᶜ, thus providing for joint energization of the windings 24ª and 25ª of switches 24 and 25. The contacts 24ᵇ, 24ᶜ, 24ᵈ and 25ᵇ, 25ᶜ, 25ᵈ of said switches 24 and 25 when closed provide for parallel connection of the windings of the respective groups $b$, $c$; $d$, $e$ and $f$, $g$ across the phases of lines $L^1$, $L^2$ and $L^3$, in relations providing for forward or reverse movement of motor 19ᵇ, depending upon closure of switch 20 or switch 21. In like manner engagement of contactor 28 with contact 28ᵈ effects completion of the energizing circuits of windings 26ª and 27ª of switches 26 and 27; the contacts 26ᵇ, 26ᶜ, 26ᵈ and 27ᵇ, 27ᶜ, 27ᵈ of said switches when closed providing for parallel connection of the windings of the respective groups $h$, $i$; $j$, $k$ and $l$, $m$ across the phases of lines $L^1$, $L^2$ and $L^3$, in relations providing for forward or reverse movement of motor 19ᵇ at full speed, depending upon whether switch 20 or switch 21 is closed.

Upon movement of contactor 28 of the speed-selector switch into engagement with contact 28ᵉ an energizing circuit is completed for the operating winding 29ª of a relay 29, said circuit extending from line $L^3$ through said contactor 28 and contact 28ᵉ by conductor 62 through said winding 29ª and by conductor 63 to line $L^1$. As aforeindicated the number of speed-selector switches 28 will correspond with the number of driving motors employed in a given installation, and each of said selector switches has associated therewith one of said relays 29. Each relay 29 is provided with normally open contacts 29ᵇ, 29ᶜ, 29ᵈ and 29ᵉ,—the same being adapted when closed to transfer speed control of their respectively associated motors to the master speed-selector switch having an adjustable contactor 30 and stationary contacts 30ª, 30ᵇ, 30ᶜ and 30ᵈ, which correspond functionally with the contacts 28ª, 28ᵇ, 28ᶜ and 28ᵈ of the individual speed-selector switches 28.

The parts of motor 18ᵇ and the individual control elements therefor are identical with the parts and control elements of motor 19ᵇ aforedescribed and the same have been given like characters of reference,—except that the manually adjustable contactor of the sending rheostat 31 associated with motor 18ᵇ has been designated by the numeral 64 to better distinguish the same in the control panel illustrated in Fig. 2,—the other manually operable contactors of the complete control system being designated by numerals 65, 66, 67, 68 and 69 in the latter figure. The individual speed-selector switches are shown as having operating knobs 28 in Fig. 2,—each of said knobs being provided with a pointer or indicator, and the panel being provided with dial markings to indicate whether quarter, half, three-quarters or full speed has been selected or whether control has been transferred to the master speed control switch the knob of which is shown at 30. In like manner knob 30 is provided with a pointer and dial markings to indicate "off" position or selection of quarter, half, three-quarters or full speed (the quarter-speed marking being located at the left-hand side in each instance). The push button switches 36, 37 and 38 and the lamp 39 are shown arranged in a convenient position at the right-hand side of the panel 70 in Fig. 2,—said push buttons preferably having suitable legends such as "Up", "Down" and "Off" respectively associated therewith. The manner of operating the control system illustrated in Figs. 2 and 4 will be apparent from the foregoing description. Moreover, in view of the simplicity and flexibility of the system as a whole other variations in the manner of manipulating the several control elements will at once suggest themselves to those skilled in the art, and hence further description thereof is deemed unnecessary.

As heretofore pointed out the lamp 39 is employed to indicate whether or not the relay 35 is in closed position,—the same if extinguished therefore serving to indicate that any one or all of the sending rheostat contactors 31ª, 64, etc., may be adjusted to preselect a curtain contour to be thereafter attained at the will of the operator. Also as will be understood a manually operable main switch (not shown) may be provided for disconnecting lines L¹, L² and L³ from the source of alternating current supply,—and a similar switch (not shown) may be provided to control the supply of direct current to lines L⁴ and L⁵.

In Figs. 3 and 5 we have shown a modified arrangement of parts for the individual and/or joint control of a plurality of direct current motors whereby preselection and subsequent attainment of any desired curtain contour is provided for; means being provided for semi-automatically insuring selection of speeds for the several motors which are definitely proportional to the degrees of travel thereof incident to attainment of a given curtain contour.

Thus it may be assumed that the curtain is of the character illustrated at 11 in Fig. 1, and that cables 13 to 19, inclusive, are attached thereto and to sheaves 13ª to 19ª, inclusive, for raising and/or lowering the associated portions of said curtain. The motors in this instance are of the direct current type,—two of the seven motors employed being shown at 71 and 72. Motor 71 and the control means therefor will now be described, it being understood that the other motors and the control means therefor are of identical form, as indicated in connection with motor 72. Thus motor 71 is provided with a rotatable armature 73 and a shunt field 74, a pair of switches 75 and 76 being arranged for energization selectively to provide for completion of the field circuit and to control the direction of current flow through the motor armature. Thus switch 75 is provided with an operating winding 75ª, contacts 75ᵇ for controlling continuity of the shunt field circuit, contacts 75ᶜ and 75ᵈ for controlling continuity of the armature circuit, and contacts 75ᵉ for controlling continuity of the circuit of releasing winding 77ª of brake 77. Similarly switch 76 is provided with an operating winding 76ª, contacts 76ᵇ for controlling continuity of said field circuit, contacts 76ᶜ and 76ᵈ for controlling continuity of said armature circuit, and contacts 76ᵉ for controlling continuity of the circuit of said winding 77ª.

Lines L⁶ and L⁷ may be connected directly, or through the medium of a manually operable switch (not shown), to a suitable source of supply of direct current. The individual control means for motor 71 comprises essentially a sending rheostat 78 having a contactor 78ª which is manually adjustable as by means of handle 78ᵇ to preselect the position of the curtain portion controlled by motor 71, a receiving rheostat 79 having a contactor 79ª which is automatically adjustable by motor 71, through the worm and pinion gearing 79ᵇ, 79ᶜ, and a polarized relay having a coil 80 electrically connected with contactors 78ª and 79ª,—said coil having a contactor 80ª which is movable in one direction into engagement with a contact 80ᵇ to complete the energizing circuit of winding 75ª and in the opposite direction into engagement with a contact 80ᶜ to complete the energizing circuit of winding 76ª. While we have shown the windings 75ª, 76ª as being controlled directly by the polarized relay contacts, it will be understood that any suitable or well known arrangement of control relays may be interposed in the control circuits.

Relays 81 and 82 are provided, said relays having operating windings 81ª and 82ª, respectively. Said relays are also provided with main contacts 81ᵇ, 82ᵇ adapted upon closure thereof to effect connection of rheostats 78, 79 and 80 in the form of a Wheatstone bridge. Said relays are respectively provided with auxiliary contacts 81ᶜ, 82ᶜ which are adapted when closed to provide maintaining circuits for the respective windings 81ª and 82ª. Inasmuch as each motor of the system requires a Wheatstone bridge device of the character aforementioned, it is to be understood that the number of main contacts 81ᵇ, 82ᵇ on the relays 81, 82 will correspond with the number of motors employed.

The contactor 78ª of sending rheostat 78 is shown diagrammatically as being slidable along the conductor or bus member 78ᶜ, a spring member 78ᵈ being employed to insure proper electrical engagement between said parts. Rigidly attached to and movable with contactor 78ª is a bracket 83 of insulating material, the arms 83ª, 83ᵇ having attached thereto the opposite ends of a resistor 84,—said ends being permanently electrically connected to each other as by means of a conductor 85. Conductor 85 is engageable through slider 86 with a bus member 87, and the mid-point of resistor 84 is connected through conductor 88 with the shunt field winding 74. Resistor 84 has associated therewith a contactor 84ª which is manually adjustable as by means of a handle 84ᵇ,—said contactor having slidable engagement with a conductor or bus member 84ᶜ, and having a spring 84ᵈ associated therewith to insure proper electrical engagement between said parts.

Due to the arrangement of the resistor 84 and its associated parts in the form of a potentiometer with respect to shunt field winding 74, it will be apparent that when contactor 84ª is in engagement with the mid-point of the resistor said field winding will be subjected to full line voltage, such full field strength providing for operation of motor 71 at a minimum or base speed. Conversely, when contactor 84ª or resistor 84 are moved in either direction relatively to each other a variable portion of resistor 84 will be included in the field circuit with a consequent proportional increase in the motor speed. We utilize this novel arrangement of control parts to provide simple means for preselecting a motor speed which is definitely proportional to the degree of travel of a given curtain portion with respect to its total range. That is to say, if the curtain portion is to travel throughout its entire range (full lowered to full raised position or full raised to full lowered position) a maximum amount of resistor 84 will be included in the field circuit to provide a maximum speed of the motor, whereas if a small degree of movement is preselected approximately full field strength is provided to insure substantially minimum speed of the motor.

Thus lower extreme positioning of contactors 78ᵃ and 79ᵃ, as illustrated, corresponds with lower extreme positioning of the curtain portion controlled by motor 71. Consequently the Wheatstone bridge circuit is balanced, to permit neutral positioning of polarized relay contactor 80ᵃ as illustrated. Let it be assumed that it is desired to hoist to its upper extreme position the curtain portion controlled by motor 71, it being further assumed that both of the relays 81 and 82 are in open position, and that the contactor 84ᵃ associated with resistor 84 is in the relative position illustrated in Fig. 5, and as indicated by the lower extreme positioning of the handle 84ᵇ within slot 89ᵇ of panel 89 in Fig. 3. To accomplish the result just mentioned, contactor 78ᵃ of sending rheostat 78 is moved to its upper extreme position by a corresponding movement of the handle 78ᵇ within the slot 89ᵃ in said panel 89. At the same time, due to attachment of bracket 83 to contactor 78ᵃ, the resistor 84 will be moved bodily upwardly to such an extent that the lower end thereof will engage contactor 84ᵃ. Maximum weakening of the shunt field 74 is thus provided for, so that maximum speed of motor 71 is insured upon initiation of operation thereof.

The handles of the sending rheostat contactors of the individual controls of the other motors employed in the system are designated by the numerals 90 to 95, inclusive, and the handles of the respectively associated speed control contactors are designated by the numerals 96 to 101, inclusive, in Fig. 3. Accordingly assuming the desired positioning or adjustment of the position-preselecting and motor-speed preselecting elements of the individual controls for the respective motors in the system, initiation of the joint operation of the several active motors, to provide for attainment of the desired curtain contour, is effected by momentarily depressing the "up" push button 102. This completes an energizing circuit for the winding 82ᵃ of relay 82, said circuit extending from line L⁶ through normally closed "off" push button 103, contacts 102ᵃ, 102ᶜ of switch 102 and by conductor 104 through said winding 82ᵃ to line L⁷. The main contacts 82ᵇ (one set for each bridge circuit of the system) of said relay are thus closed, and upon closure of the auxiliary contacts 82ᶜ of said relay a maintaining circuit is provided which may be traced from line L⁶ through push button switch 103, conductor 105 through said auxiliary contacts 82ᶜ and thence through winding 82ᵃ to line L⁷. An energizing circuit for the winding 81ᵃ of relay 81 is also provided,—said circuit extending from line L⁶ through switch 103 and contacts 102ᵃ, 102ᵇ of switch 102, thence through the normally closed contacts of "down" push button switch 106 and through said winding 81ᵃ by conductor 107 to line L⁷. The main contacts 81ᵇ (one set for each bridge circuit of the system) of said relay are thus closed, and upon closure of the auxiliary contacts 81ᶜ of said relay a maintaining circuit is provided which may be traced from line L⁶ through switch 103, by conductor 105 through auxiliary contacts 82ᶜ of relay 82, conductors 104 and 108 through said auxiliary contacts 81ᶜ, and thence through the normally closed contacts of switch 106 and winding 81ᵃ by conductor 107 to line L⁷.

Under the conditions heretofore assumed the Wheatstone bridge circuit associated with motor 71 will be unbalanced in a direction to cause engagement of polarized relay contactor 80ᵃ with contact 80ᵇ. This completes an energizing circuit for the operating winding 75ᵃ of switch 75, said circuit extending from line L⁶ by conductors 109, 110 and 111 through said contactor 80ᵃ and contact 80ᵇ, thence through said winding 75ᵃ by conductor 112 to line L⁷. Contacts 75ᵇ of switch 75 are closed to complete a circuit for the shunt field winding 74, said circuit extending from line L⁶ by conductors 113, 114 and bus 84ᶜ through contactor 84ᵃ and (under the assumed conditions) through the entire lower half of resistor 84, by conductor 88, field 74, conductor 115, contacts 75ᵇ and conductor 116 to line L⁷. The armature circuit of motor 71 may be traced from line L⁶ by conductors 117, 118, contacts 75ᶜ, through the motor armature 73 from left to right, conductor 119 through contacts 75ᵈ, and by conductors 120, 121 to line L⁷. An energizing circuit for the brake releasing winding 77ᵃ may likewise be traced from line L⁶ by conductors 117 and 122 through contacts 75ᵉ and thence through said winding 77ᵃ to line L⁷.

Motor 71 therefore operates at maximum speed in a direction to raise the curtain portion controlled thereby (through the medium of sheave 19ᵃ and cable 19), contactor 79ᵃ of receiving rheostat 79 being moved upwardly by motor 71 until said contactor reaches its upper extreme position, whereupon the Wheatstone bridge circuit will be balanced to permit movement of the polarized relay contactor 80ᵃ to its neutral position, with consequent de-energization and opening of switch 75 to effect interruption of the motor armature and field circuits and to permit application of brake 77.

As will be understood, when all portions of the curtain are to be raised or lowered, all of the motors will be rendered active simultaneously upon momentary depression of push button 102 as aforedescribed. Moreover, due to the provision of the aforedescribed speed preselecting means for the individual motors, the speeds of the several motors will be respectively proportional to the degrees of movement (either raising or lowering) of the curtain portions controlled thereby, so that the final positions of the several curtain portions will be attained simultaneously. This feature is very important from the practical and esthetic viewpoint, since a smooth and gradual change from one curtain contour to another is insured, due to movement of the multiplicity of curtain portions at speeds proportional to their respective degrees of movement.

A lamp 123 is provided,—the same being arranged as shown to be illuminated so long as the relay 82 is energized and closed. The motor 72 will have parts associated therewith which are identical with the parts described in connection with motor 71, and said parts have been given like characters of reference, with the exception of parts 18, 18ᵃ, 90 and 96 aforementioned. The control elements for the other motors of the system will of course be of corresponding character.

Referring again to the control of motor 71, and assuming upper extreme positioning of contactors 78ᵃ and 79ᵃ and lower extreme positioning of contactor 84ᵃ (as represented by lower extreme positioning of handle 84ᵇ thereof within slot 89ᵇ, Fig. 3). If it is desired to lower from its full-raised to half-raised position the curtain portion controlled by motor 71 to provide a curtain contour differing from that obtaining this result is preferably accomplished by first depressing the "off" push button switch 103, with consequent interruption of the maintaining circuits of the relay windings 81ª, 82ª whereby the contacts of relays 81 and 82 are opened to temporarily disable all of the Wheatstone bridge circuits. Thereupon handle 84ᵇ of contactor 84ª is moved to its upper extreme position within slot 89ᵇ, so that the handles 78ᵇ, 84ᵇ (Fig. 3) will then be in alinement. The consequence of this is that contactor 84ª will again register with the mid-point of resistor 84, which corresponds with the base or minimum speed of motor 71. To preselect half-raised positioning of the aforementioned curtain portion, the sending rheostat contactor 78ª will then be moved downwardly to its mid-position, as represented by the dotted line position of handle 78ᵇ within slot 89ª in Fig. 3. Such downward movement of contactor 78ª will likewise effect bodily movement of resistor 84 downwardly with respect to contactor 84ª, with the result that the mid-point of the upper half of resistor 84 will register with said contactor 84ª. Consequently half-speed operation of motor 71 is preselected in a simple and efficient manner, and upon subsequent momentary closure of push button switch 102 the energizing circuits for the operating windings of relays 81 and 82 are completed, the Wheatstone bridge circuits for the several motors are rendered active and the several motors are operated automatically to provide for attainment of the desired contour of the curtain as a whole. Operation of motor 71 in a direction to lower the curtain portion controlled thereby will of course be interrupted when contactor 79ª has been moved to the mid-point of receiving rheostat 79 to effect re-balancing of the bridge circuit.

After the several motors have been operated in the manner aforedescribed to provide for attainment of a given curtain contour, all of the curtain portions may be brought to full lowered position by temporarily depressing the "down" push button switch 106. Thus upon opening of the normally closed contacts of said switch 106 the aforedescribed maintaining circuit for winding 81ª of relay 81 is interrupted, and the several main contacts 81ᵇ of said relay in opening are adapted to partially disable the several Wheatstone bridge circuits. Closing of contacts 106ᵇ of said switch would provide an energizing circuit for the winding 82ª of relay 82,—if said winding had previously been de-energized by opening of "off" switch 103. As will be apparent from the control elements of motor 71, with contactor 79ª in its upper extreme position (or at any point above its lower extreme position) coil 80 of the polarized relay will be subjected to a flow of current in a direction to cause engagement of the polarized relay contactor 80ª whereby an energizing circuit is completed for the winding 76ª of reversing switch 76,—the contacts 76ᵇ thereof completing a circuit for the shunt field, the contacts 76ᶜ, 76ᵈ completing a reverse circuit for the motor armature, and the contacts 76ᵉ completing a circuit for the brake releasing winding 77ª. Contactor 80ª will remain in engagement with contact 80ᶜ until rheostat contactor 79ª has reached its lower extreme position, as described in connection with the system shown in Fig. 4, or until the opposite ends of polarized relay coil 80 are at the same potential.

Moreover, under the conditions assumed the speed preselected for motor 71 (and the speeds for the other motors) will be effective during lowering of the curtain portion or portions. That is to say, if the curtain portions are moved from full lowered position to provide a preselected contour,—all portions of the curtain will simultaneously reach full lowered position upon depression of button 106.

As will be apparent from the foregoing description, any curtain portion may be maintained in full lowered, full raised or any intermediate position during raising or lowering of any of the other curtain portions,—it being obvious that some adjustment of the individual control elements is necessary to effect movement of the curtain portions controlled by the respective motors.

As aforestated, we have shown in dotted lines in Fig. 3 an adjustment of the handles 78ᵇ, 90 (shown in full lines), 91, 92, 93, 94 and 95 which represents preselection of a curtain contour substantially like that shown in Fig. 1; the associated elements 84ᵇ and 96 to 101, inclusive, being allowed to remain in their lower extreme positions to provide for selection of speeds appropriate to the several driving motors of the system. Thereafter elements 84ᵇ and 96 to 101, inclusive, are moved upwardly into alinement with the respective handles 78ᵇ and 90 to 95, inclusive; whereupon said handles are rendered effective to preselect the next succeeding positions of the respective curtain portions, while simultaneously preselecting correct speeds for the motors individually.

It will be apparent to those skilled in the art that each of the individual driving motors may have associated therewith a set of limit switches, such as limit switches of machine type, to insure against overtravel thereof in either direction. In general, however, the contacts of the several polarized relays will properly perform this function, as aforedescribed.

What we claim as new and desire to secure by Letters Patent is:

1. In a control system of the character described, in combination, a plurality of devices each adapted to be operated in reverse directions selectively throughout a predetermined maximum range, the ranges of operation of the several devices being substantially equal to each other, a corresponding number of reversible electric motors for effecting such operation of said devices, means for individually and/or jointly controlling the operation of said electric motors, said means comprising adjustable elements individual to the respective motors whereby the direction and degree of operation of said motors may be preselected, said elements being so arranged as to indicate the relative positions to be finally assumed by said devices as a result of operation of the respective motors, and means comprising a single normally open push button switch adapted upon closure thereof to simultaneously initiate operation of all active motors.

2. In a control system of the character described, in combination, a plurality of devices each adapted to be operated in reverse directions selectively throughout a predetermined maximum range, the ranges of operation of the several devices being substantially equal to each other, a corresponding number of variable speed reversible electric motors for effecting such operation of said devices, means for individually and/or jointly controlling the operation of said electric motors, said means comprising adjustable elements individual to the respective motors whereby the direction and degree of operation of said motors may be preselected, said elements being so arranged as to indicate the relative positions to be finally assumed by said devices as a result of operation of the respective motors, means associated with said motors individually to provide for preselection of speeds thereof substantially proportional to the degrees of operation thereof so preselected, and means comprising a single normally open push button switch adapted upon closure thereof to simultaneously initiate operation of all active motors.

3. In a control system of the character described, in combination, a plurality of devices each adapted to be operated in reverse directions selectively throughout a predetermined maximum range, the ranges of operation of the several devices being substantially equal to each other, a corresponding number of variable speed reversible electric motors for effecting such operation of said devices, means for individually and/or jointly controlling the operation of said electric motors, said means comprising adjustable elements individual to the respective motors whereby the direction and degree of operation of said motors may be preselected, said elements being so arranged as to indicate the relative positions to be finally assumed by said devices as a result of operation of the respective motors, means associated with said motors individually to provide for preselection of speeds thereof substantially proportional to the degrees of operation thereof so preselected, a common master speed control instrumentality and means for transferring control from said last mentioned individual means to said master speed control instrumentality, and means comprising a single normally open push button switch adapted upon closure thereof to simultaneously initiate operation of all active motors.

4. The combination with a stage curtain or the like, of a plurality of reversible electric motors and means providing driving connections between said motors and spaced points along the lower edge of said curtain, and control means for said motors including means for preselecting at will the degrees of operation thereof individually whereby the final contour of said curtain may be predetermined, said control means also including a common control instrumentality to provide for simultaneous initiation of operation of all active motors at will.

5. The combination with a stage curtain or the like, of a plurality of reversible electric motors and means providing driving connections between the respective motors and spaced points along the width of said curtain adjacent to the lower edge thereof, control means for said motors including means for preselecting at will the degrees of operation thereof individually whereby the final contour of said curtain may be predetermined, said control means also including a common control instrumentality to provide for simultaneous initiation of operation of all active motors at will, and means including a single switch associated with said common control instrumentality and operable at will to simultaneously initiate reverse operation of the aforementioned active motors whereby the raised portions of said curtain are allowed to fall.

6. The combination with a stage curtain or the like, of a plurality of reversible electric motors and a corresponding number of cables providing operative connections between the respective motors and the curtain at spaced points along the lower edge of the latter, control means for said motors including means operable individually at will for preselecting the degrees of operation of the respective motors whereby the final contour of said curtain may be predetermined, said individual means when so operated being adapted to jointly simulate said curtain contour, and said control means also including a manually operable common control instrumentality to provide for simultaneous initiation of operation of all active motors to provide for attainment of the curtain contour so preselected.

7. The combination with a stage curtain or the like, of a plurality of reversible electric motors and a corresponding number of cables providing operative connections between the respective motors and the curtain at spaced points along the lower edge of the latter, control means for said motors including means operable individually at will for preselecting the degrees of operation of the respective motors whereby the final contour of said curtain may be predetermined, said individual means when so operated being adapted to jointly simulate said curtain contour, said control means also including a manually operable common control instrumentality to provide for simultaneous initiation of operation of all active motors to provide for attainment of the curtain contour so preselected, and associated means operable at will to temporarily render ineffective said common control instrumentality, whereby said individual means may be operated to preselect a curtain contour differing from that obtaining.

8. The combination with a stage curtain or the like, of a plurality of reversible electric motors and a corresponding number of cables providing operative connections between the respective motors and the curtain at spaced points along the lower edge of the latter, control means for said motors including means operable individually at will for preselecting the degrees of operation of the respective motors whereby the final contour of said curtain may be predetermined, said individual means when so operated being adapted to jointly simulate said curtain contour, said control means also including a manually operable common control instrumentality to provide for simultaneous initiation of operation of all active motors to provide for attainment of the curtain contour so preselected, and associated means operable at will to temporarily render ineffective said common control instrumentality, whereby said individual means may be operated to preselect a curtain contour differing from that obtaining, said common control instrumentality when operated thereafter being adapted to provide for attainment of the curtain contour last preselected.

9. The combination with a stage curtain or the like, of a plurality of reversible electric motors and a corresponding number of cables providing operative connections between the respective motors and the curtain at spaced points along the lower edge of the latter, control means for said motors including means operable individually at will for preselecting the degrees of operation of the respective motors whereby the final contour of said curtain may be predetermined, said individual means when so operated being adapted to jointly simulate said curtain contour, additional means individually associated with the respective motors to provide for preselection of speeds thereof substantially proportional to the degrees of operation thereof preselected by said individual means first mentioned, and said control means also including a manually operable common control instrumentality to provide for simultaneous initiation of operation of all active motors to provide for attainment of the curtain contour so preselected.

10. The combination with a stage curtain or the like, of a plurality of reversible electric motors and means providing driving connections between said motors and spaced points along the lower edge of said curtain, said motors being operable in one direction throughout a predetermined maximum range to provide for movement of the respective curtain portions from full lowered to full hoisted positions, control means for said motors including means for individually preselecting at will the degrees of operation thereof in said direction whereby the degrees of upward movement of the respective curtain portions may be predetermined, associated means individual to the respective motors to provide for preselection of speeds thereof directly proportional to the degrees of operation preselected therefor, means including a common control instrumentality to provide for simultaneous initiation of operation of all active motors at will, whereby the preselected positions of the respective curtain portions are attained simultaneously, and associated means comprising a common control instrumentality for simultaneously initiating reverse operation of the aforementioned active motors, under like conditions of speed control, whereby all portions of the curtain are simultaneously brought to full lowered position.

11. In a device of the character described, in combination, a driven device, a reversible electric motor for driving said device, means for controlling the direction, rate and degree of operation of said motor, said means comprising a sending rheostat, a receiving rheostat and a polarized relay coil arranged in the form of a Wheatstone bridge, adjustable contactors associated with the respective rheostats, a pair of electromagnetically operable switches selectively controllable by said polarized relay for determining the direction and degree of operation of said motor in accordance with the relative positions of said contactors, and associated means adapted to provide for preselection of a motor speed substantially proportional in each instance to the degree of operation preselected therefor, whereby all operations of said motor are effected in substantially equal periods of time.

12. In a device of the character described, in combination, a driven device, a reversible electric motor for driving said device, said motor having a shunt field, means for controlling the direction, rate and degree of operation of said motor, said means comprising a sending rheostat, a receiving rheostat and a polarized relay coil arranged in the form of a Wheatstone bridge, adjustable contactors associated with the respective rheostats, a pair of electromagnetically operable switches selectively controllable by said polarized relay for determining the direction and degree of operation of said motor in accordance with the relative positions of said contactors, associated means adapted to provide for preselection of a motor speed substantially proportional to the degree of operation preselected therefor, said last mentioned means including a resistor and an adjustable contactor connected in the form of a potentiometer within the field circuit of said motor, said last mentioned contactor and said sending rheostat contactor being adapted when arranged in given positions relatively to each other to provide a predetermined minimum speed of said motor, and said sending rheostat contactor when moved from the last mentioned position thereof being adapted to effect bodily movement of said potentiometer resistor to proportionally weaken the field of said motor and correspondingly increase the speed thereof.

13. In a device of the character described, in combination, a reversible electric motor for driving said device, said motor having a shunt field, means for controlling the direction, rate and degree of operation of said motor, said means comprising a sending rheostat, a receiving rheostat and a polarized relay coil arranged in the form of a Wheatstone bridge, adjustable contactors associated with the respective rheostats, a pair of electromagnetically operable switches selectively controllable by said polarized relay for determining the direction and degree of operation of said motor in accordance with the relative positions of said contactors, associated means adapted to provide for preselection of a motor speed substantially proportional to the degree of operation preselected therefor, said last mentioned means including a resistor and an adjustable contactor connected in the form of a potentiometer within the field circuit of said motor, said last mentioned contactor and said sending rheostat contactor being adapted when arranged in given positions relatively to each other to provide a predetermined minimum speed of said motor, and said sending rheostat contactor when moved in either direction from the last mentioned position thereof being adapted to preselect the direction of operation of said motor, said last mentioned contactor when so moved being also adapted to effect corresponding bodily movement of said potentiometer resistor to proportionally weaken the field of said motor whereby the speed of the latter is increased.

14. In an electric motor control system, in combination, a plurality of reversible electric driving motors, means individual to each of the respective motors for controlling the direction, rate, and degree of operation thereof, said individual control means each comprising a sending rheostat, a receiving rheostat and a polarized relay coil arranged in the form of a Wheatstone bridge, adjustable contactors associated with the respective rheostats, a plurality of pairs of electromagnetically operable switches each pair being controllable by one of said polarized relays for determining the direction and degree of operation of the motor respectively controlled thereby in accordance with the relative positions of said contactors, means associated with each of said individual control means to provide for preselection of a motor speed substantially proportional to the degree of operation preselected therefor, and means comprising a common control instrumentality for simultaneously initiating operation of all active motors.

15. In an electric motor control system, in combination, a plurality of reversible electric driving motors, each of said motors having a shunt field, means individual to each of the respective motors for controlling the direction, rate and degree of operation thereof, said individual control means each comprising a sending rheostat, a receiving rheostat and a polarized relay coil arranged in the form of a Wheatstone bridge, adjustable contactors associated with the respective rheostats, a plurality of pairs of electromagnetically operable switches each pair being controllable by one of said polarized relays for determining the direction and degree of operation of the motor respectively controlled thereby in accordance with the relative positions of said contactors, means associated with each of said individual control means to provide for preselection of a motor speed substantially proportional to the degree of operation preselected therefor, said last mentioned means including a resistor and an adjustable contactor connected in the form of a potentiometer within the field circuit of its respectively associated motor, said last mentioned contactor and said sending rheostat contactor being adapted when arranged in given alined positions to provide for operation of said motor at minimum speed, said sending rheostat contactor when moved from the last mentioned position thereof being adapted to effect bodily movement of said potentiometer resistor to proportionally weaken the field of its associated motor and thereby correspondingly increase the speed thereof, and means comprising a common control instrumentality for simultaneously initiating operation of all active motors.

16. In an electric motor control system, in combination, a plurality of reversible electric driving motors, each of said motors having a shunt field, means individual to each of the respective motors for controlling the direction, rate and degree of operation thereof, said individual control means each comprising a sending rheostat, a receiving rheostat and a polarized relay coil arranged in the form of a Wheatstone bridge, adjustable contactors associated with the respective rheostats, a plurality of pairs of electromagnetically operable switches each pair being controllable by one of said polarized relays for determining the direction and degree of operation of the motor respectively controlled thereby in accordance with the relative positions of said contactors, means associated with each of said individual control means to provide for preselection of a motor speed substantially proportional to the degree of operation preselected therefor, said last mentioned means including a resistor and an adjustable contactor connected in the form of a potentiometer within the field circuit of its respectively associated motor, said last mentioned contactor and said sending rheostat contactor being adapted when arranged in given alined positions to provide for operation of said motor at minimum speed, said sending rheostat contactor when moved from the last mentioned position thereof being adapted to effect bodily movement of said potentiometer resistor to proportionally weaken the field of its associated motor and thereby correspondingly increase the speed thereof, means comprising a common control instrumentality for simultaneously initiating operation of all active motors, and means including a single manually operable switch associated with said common control instrumentality, said switch when operated being adapted to effect simultaneous operation of all active motors to like extreme positions within their range.

17. In a device of the character described, in combination, a variable speed reversible driving motor, control means for said motor comprising a sending rheostat, a receiving rheostat and a polarized relay coil arranged in the form of a Wheatstone bridge, a contactor associated with said sending rheostat and adjustable manually to effect unbalancing of the Wheatstone bridge, a contactor associated with said receiving rheostat and operable automatically by said motor to effect re-balancing of the Wheatstone bridge, a contactor associated with said relay coil, a pair of electromagnetically operable switches operable selectively to control the direction of operation of said motor, said switches being subject to control by said last mentioned contactor whereby said motor is limited to operation in reverse directions respectively throughout a predetermined maximum range, and speed selecting means associated with said motor, said speed selecting means including means operable at will to preselect a motor speed which is definitely proportional to the instantaneous range of operation of the motor regardless of the direction of such operation, whereby all operations of said motor are effected in substantially equal periods of time.

EIVIND U. LASSEN.
EDWIN W. SEEGER.